Patented Oct. 27, 1942

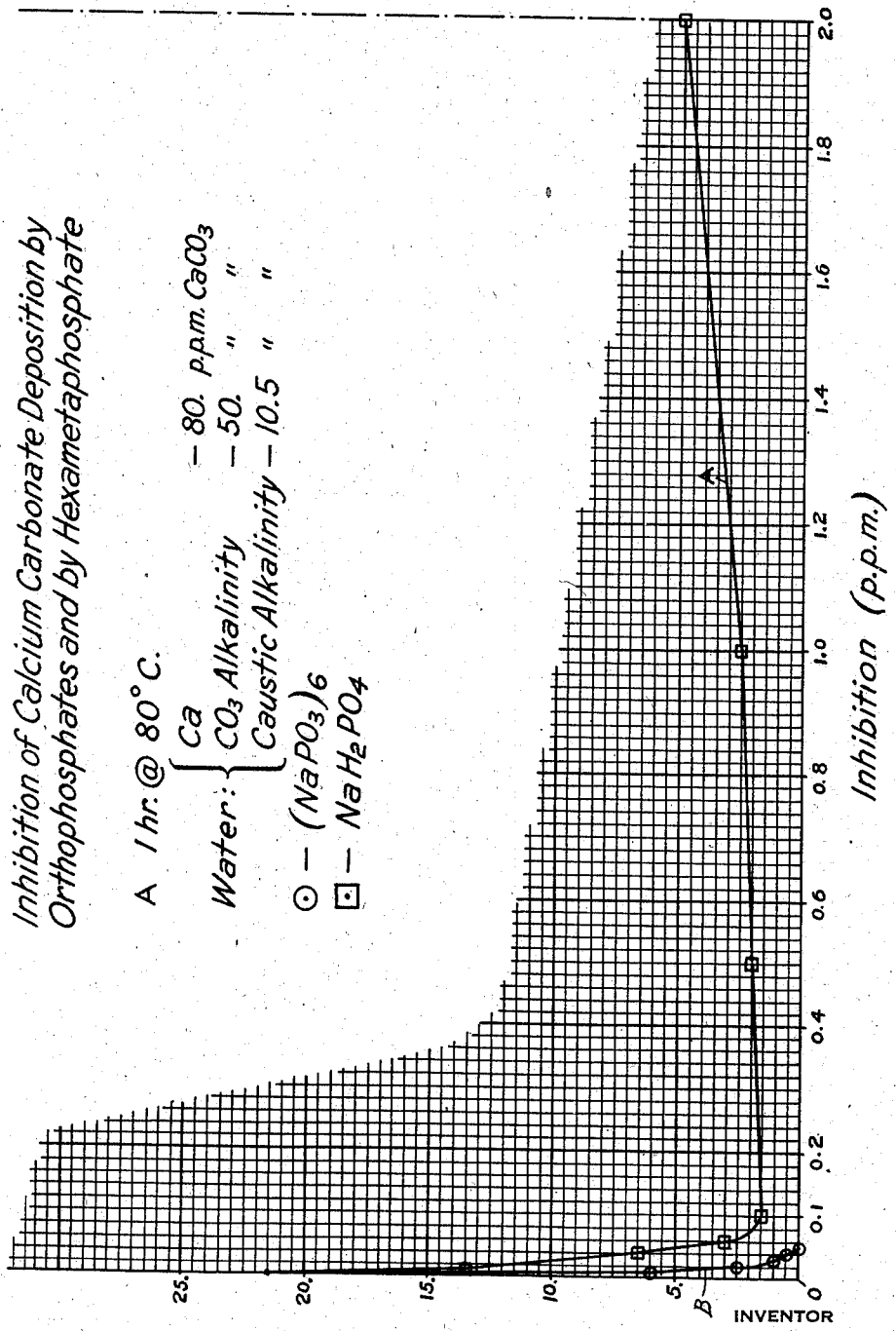

2,299,748

UNITED STATES PATENT OFFICE 2,299,748

CONTROL OF CALCIUM CARBONATE DEPOSITION FOR CORROSION INHIBITION

George B. Hatch, Pittsburgh, Pa., assignor to Hall Laboratories, Inc., Pittsburgh, Pa., a corporation of Pennsylvania Application May 13, 1939, Serial No. 273,524

9 Claims. (Cl. 117—97)

This invention relates generally to the treatment of water and more particularly to the treatment of water to control the deposition of calcium or other alkaline earth metal carbonate in the pipe lines of a water distribution system, in order to inhibit corrosion of the pipe lines. For purposes of conciseness, I shall refer to the control of calcium carbonate deposition, it being understood that this is intended to include control of deposition of magnesium carbonate, calcium carbonate or other alkaline earth metal carbonates.

The prevention of corrosion of metal pipe lines in water distribution systems such as those employed in municipal water supply systems has presented a problem for many years. The type of water which is particularly troublesome in this respect is that which is relatively soft and contains bicarbonate ion or free $CO_2$. One example of such a water is the water supply for New York city, which is very soft, containing only about 14 P. P. M. calcium, and is corrosive.

Various measures have been resorted to to overcome the corrosive character of such waters but these have not proved entirely satisfactory. The cheapest way is to add lime to the water so as to form a protective coating of calcium carbonate.

In order to form this protective coating, however, it is practically always necessary to add the lime in excess and although this causes deposition of calcium carbonate in the pipe lines adjacent the treating plant, it leaves the distant parts of the system unprotected against corrosion. As the deposition occurs, calcium is eliminated from the water and the water becomes less alkaline and less supersaturated with respect to calcium carbonate and tends to become more susceptible of corroding the pipe lines at distant points. The addition of lime results in the uncontrolled deposition of calcium carbonate, causing too thick a deposit in the pipes adjacent the treating plant and leaving the pipes at distant points in the distribution system, either unprotected or insufficiently protected from the corrosive action of the water.

The objections to the use of lime apply also to the addition of sodium hydroxide or sodium carbonate.

In order to form a protective deposit in a cold water line, a fair degree of supersaturation, with respect to calcium carbonate, must be maintained. In a hot water system the tendency to remain supersaturated is much less than in a cold system. Thus a water treated in such a manner that it will form a thin, protective calcium carbonate deposit in the water mains, where the temperature is relatively low, will become quite heavily encrustant upon heating. Moreover, since the tendency to remain supersaturated in a hot system is much less than in a cold one, the problem of localized deposition is even more pronounced, most of the precipitation taking place in the heater with the result that it plugs up with scale while the rest of the hot water system corrodes.

According to the preferred embodiment of the present invention, lime or sodium carbonate are added to water containing insufficient calcium and carbonate ion to deposit calcium carbonate under the conditions in which the water is used, and then the precipitation of calcium carbonate which would normally occur principally adjacent the treating plant is overcome in such manner that the precipitation is caused to occur in a regulated manner throughout the distribution system. This is accomplished by adding to the water, which has been treated with the lime or sodium carbonate, controlled and regulated amounts of a material containing the orthophosphate radical, for example monosodium dihydrogen orthophosphate. The orthophosphate is added in very small amounts, such as not over about 2 P. P. M. of water. The orthophosphate may amount to only .02 P. P. M. but the addition is regulated so as to produce the thickness of deposit desired. The orthophosphate controls the deposition of calcium carbonate, delaying this deposition so that it occurs throughout the water distribution system. In this way a thin deposit of calcium carbonate of controlled thickness may be laid down which is advantageous in preventing corrosive attack of the pipe lines by the water.

The accompanying drawing is a graph showing the amount of calcium carbonate deposit in P. P. M. of water for different quantities of sodium orthophosphate ($NaH_2PO_4$) used as a corrosion inhibitor by controlling the thickness of calcium carbonate deposit.

Referring more particularly to the accompanying graph, it shows two curves designated A and B. The curve A shows the calcium carbonate deposited (P. P. M.) of water for different quantities of monosodium dihydrogen orthophosphate ($NaH_2PO_4$) varying from zero to 2.0 P. P. M. of water. Curve B is a similar curve representing the calcium carbonate deposited for different quantities of sodium hexametaphosphate ($Na_6P_6O_{18}$). The calcium carbonate deposited upon heating water for one hour at 80° C. was determined, the water containing:

Calcium=80 P. P. M. CaCO₃
Carbonate alkalinity=50 P. P. M. CaCO₃
Caustic alkalinity=10.5 P. P. M. CaCO₃

Varying amounts of sodium orthophosphate from .01 P. P. M. of water were added, the water heated at the temperature and for the time specified and the amount of calcium carbonate deposited was determined. It will be seen from curve A that the water without the addition of any orthophosphate deposited 21.5 P. P. M. calcium carbonate. When .01 P. P. M. orthophosphate was added, the calcium carbonate deposited was 13.5 P. P. M. and the deposit corresponding to .04 P. P. M. orthophosphate was 6.5 P. P. M. of calcium carbonate. The following table shows the data corresponding to curve A:

Table

| $NaH_2PO_4$ | $CaCO_3$ precipitated |
|---|---|
| P. P. M. | P. P. M. |
| 0 | 21.5 |
| 0.01 | 13.5 |
| 0.04 | 6.5 |
| 0.06 | 3. |
| 0.1 | 1.5 |
| 0.5 | 2. |
| 1.0 | 2.5 |
| 2.0 | 5. |

It will be seen that for the particular water treated the addition of orthophosphate up to 0.1 P. P. M. decreased the amount of calcium carbonate deposited but that by increasing quantities of orthophosphate beyond 0.1 P. P. M. up to 2.0 P. P. M. the amount of deposit increased. Furthermore, that slight changes in orthophosphate in amount less than 0.1 P. P. M. produced relatively large changes in the amount of deposit, whereas corresponding changes in the amount of orthophosphate between 0.1 P. P. M. and 2.0 P. P. M. produced relatively small changes in the amount of the deposit. An important feature of the discovery is that although the orthophosphate may be used to vary the amount of calcium carbonate deposited it never completely prevents all deposition. There is a relatively wide range of orthophosphate which can be added without radically affecting the amount of calcium carbonate deposit. Thus any amount of orthophosphate between .04 P. P. M. and 2.0 P. P. M. may be added and the calcium carbonate deposited will be between 6.5 P. P. M. and 1.5 P. P. M.

Curve B shows the amount of calcium carbonate deposited when sodium hexametaphosphate is added to the water. It will be seen that small changes in metaphosphate concentration produce large changes in the amount of calcium carbonate deposited. Thus by increasing the sodium metaphosphate from .01 P. P. M. to .02 P. P. M., the calcium carbonate deposit is reduced from 6 P. P. M. to 2.5 P. P. M. Furthermore, when .05 P. P. M. of metaphosphate is used, the deposition of calcium carbonate is completely prevented. Although the alkali-metal metaphosphates, pyrophosphates and tripolyphosphates affect the amount of calcium carbonate deposited, and accordingly may serve a useful purpose according to the present invention, they are not nearly as advantageous as the orthophosphates. The metaphosphates, pyrophosphates, tripolyphosphates, and all molecularly dehydrated phosphates, although capable of use, are much less desirable because of the much greater difficulty in controlling the amount of calcium carbonate deposit. Thus, as shown in curve B, the calcium carbonate deposited decreased from 6 P. P. M. to zero as the sodium hexametaphosphate concentration increased from .01 to .05 P. P. M., a change of only .04 P. P. M. of water. It is exceedingly difficult to control the amount of metaphosphate added to within these limits or within even narrower limits, so as to control the thickness of the calcium carbonate layer deposited on the water pipes. The orthophosphate, therefore, possesses distinct advantages over the other phosphates in that it may be used over a relatively wide range of concentrations while limiting the calcium carbonate to thin deposits and yet never entirely suppressing the calcium carbonate deposition. The wide range of orthophosphate concentrations at which a small amount of calcium carbonate is precipitated is desirable, since it permits the presence of a slight excess of the phosphate over the minimum required to limit the deposition to a low value, and the subsequent reserve supply of phosphate to take care of adsorption of the phosphate which may occur, without the possibility of completely preventing deposition, or even removing any deposit already present.

The amount of orthophosphate to be added will depend upon the thickness of coating desired to be deposited in the pipe lines of the water distribution system and also upon the hardness of the water treated. The amount of orthophosphate probably will not exceed about 2.0 P. P. M. of water and probably will not be less than .04 P. P. M. or .02 P. P. M.

Sodium hexametaphosphate, as distinguished from sodium orthophosphate, will actually remove calcium carbonate which has already been deposited if the metaphosphate is used in sufficiently large amounts. It may thus be advisable to use sodium metaphosphate in those cases where the deposit of calcium carbonate is already too thick and then to employ sodium orthophosphate for controlling the subsequent deposition of calcium carbonate. Or it may be desired to employ a mixture of orthophosphate and metaphosphate or tripolyphosphate in such proportions that the thickness of calcium carbonate deposit will be maintained or varied as desired.

In place of $NaH_2PO_4$, other alkali orthophosphates may be used, such as $Na_2HPO_4$ or $Na_3PO_4$ or the corresponding potassium orthophosphates or phosphoric acid. Concentrated phosphoric acid containing less water than $H_3PO_4$, such as pyrophosphoric, tetraphosphoric, metaphosphoric acids may be employed since when added to water they revert rapidly to orthophosphate. It is believed that any material which will supply the orthophosphate radical ($PO_4$) may be used. I might, for example, use calcium orthophosphate.

According to the present invention, I treat waters having a zero or negative coefficient according to the Langelier index. This index is well known and is referred to in an article by W. F. Langelier in "The Journal of the American Water Works Association," 28:1500 (1936). It gives a measure of the tendency of the water to lay down a protective film of calcium carbonate on metal and takes into consideration the temperature of the water, its alkalinity, calcium content, carbonate and bicarbonate contents. Waters having a negative Langelier coefficient will dissolve deposits of calcium carbonate, whereas those having a positive coefficient will deposit calcium carbonate. Those having a zero coefficient will neither lay down nor dissolve calcium carbonate deposits. These waters containing insufficient calcium and carbonate ion to deposit calcium carbonate under the conditions of use have added to them lime or sodium carbonate so that they will form the protective calcium carbonate deposit. This deposit is then regulated and controlled by the addition of regulated amounts of orthophosphate radical.

It is intended in the claims that the expression "carbonate ion" shall include the bicarbonate ion as well as the carbonate ion per se.

Although the invention has been described in connection with the control of a deposit of calcium carbonate, it may also be employed for controlling the amount of magnesium carbonate deposited and in the claims "alkaline earth metal carbonate" is intended to include magnesium carbonate.

The invention is not limited to the specific embodiment which has been particularly described but may be otherwise embodied or practiced within the scope of the following claims.

I claim:

1. The process of controlling the thickness of deposits of alkaline earth metal carbonates on metal surfaces from water containing said carbonates, which comprises adding to the water regulated amounts of a water soluble phosphate of the group consisting of alkali orthophosphates and orthophosphoric acid, and varying the amount of said phosphate added to control formation on the surfaces of deposits of alkaline earth metal carbonate of desired thickness to protect the surfaces against corrosion.

2. The process of controlling the thickness of deposits of alkaline earth metal carbonates on metal surfaces from water containing said carbonates, which comprises adding to the water alkali-metal orthophosphate in regulated amounts between .02 P. P. M. and 2.0 P. P. M. to control formation on the surfaces of deposits of alkaline earth metal carbonate of desired thickness to protect the surfaces against corrosion.

3. The process of treating water which contains insufficient calcium and carbonate ion to deposit calcium carbonate under the conditions in which the water is used and is corrosive to metal surfaces, which comprises adding an alkaline earth metal compound to the water in amount sufficient to cause deposition of alkaline earth metal carbonate on the surfaces, and adding to the water thus treated a water soluble phosphate of the group consisting of alkali orthophosphates and orthophosphoric acid in regulated amounts to control formation on the surfaces of deposits of alkaline earth metal carbonate of desired thickness to protect the surfaces against corrosion.

4. The process of treating water which contains insufficient calcium and carbonate ion to deposit calcium carbonate under the conditions in which the water is used and is corrosive to metal surfaces, which comprises adding lime to the water in amount sufficient to cause deposition of calcium carbonate on the surfaces, and adding to the water thus treated a water soluble phosphate of the group consisting of alkali orthophosphates and orthophosphoric acid in regulated amounts to control formation on the surfaces of deposits of calcium carbonate of desired thickness to protect the surfaces against corrosion.

5. The process of treating water which contains insufficient calcium and carbonate ion to deposit calcium carbonate under the conditions in which the water is used and is corrosive to metal surfaces, which comprises adding lime to the water in amount sufficient to cause deposition of calcium carbonate on the surfaces, and adding to the water thus treated alkali-metal orthophosphate in regulated amounts between .02 P. P. M. and 2.0 P. P. M. to control formations on the surfaces of deposits of calcium carbonate of desired thickness to protect the surfaces against corrosion.

6. The process of treating water which contains insufficient calcium and carbonate ion to deposit calcium carbonate under the conditions in which the water is used and is corrosive to metal surfaces, which comprises adding lime to the water in amount sufficient to cause deposition of calcium carbonate on the surfaces, and adding to the water thus treated alkali-metal orthophosphate in regulated amounts between 0.1 P. P. M. and 2.0 P. P. M. to control formation on the surfaces of deposits of calcium carbonate of desired thickness to protect the surfaces against corrosion.

7. The process of protecting water distribution pipes against corrosion by water containing insufficient alkaline earth metal and carbonate ion to deposit alkaline earth metal carbonate under the conditions of use, which comprises adding to the water material of the group consisting of alkaline earth metal and carbonate in amount sufficient to cause deposition of alkaline earth metal carbonate on the surface of the pipe, and adding to the water thus treated a water soluble phosphate of the group consisting of alkali orthophosphates and orthophosphoric acid in regulated amount to control formation on the surface of the pipe along long lengths thereof of deposits of alkaline earth metal carbonate of desired thickness to protect the surface against corrosion.

8. The process of protecting water distribution pipes against corrosion by water containing insufficient calcium and carbonate ion to deposit calcium carbonate under the conditions of use, which comprises adding lime to the water in amount sufficient to cause deposition of calcium carbonate on the surface of the pipe, and adding to the water thus treated alkali-metal orthophosphate in regulated amount to control formation on the surface of the pipe along long lengths thereof of deposits of calcium carbonate of desired thickness to protect the surfaces against corrosion.

9. The process of protecting water distribution pipes against corrosion by water containing insufficient calcium and carbonate ion to deposit calcium carbonate under the conditions of use, which comprises adding lime to the water in amount sufficient to cause deposition of calcium carbonate on the surface of the pipe, and adding to the water thus treated alkali-metal orthophosphate in regulated amount between .02 P. P. M. and 2.0 P. P. M. to control formation on the surface of the pipe along long lengths thereof of deposits of calcium carbonate of desired thickness to protect the surfaces against corrosion.

GEORGE B. HATCH.